(12) United States Patent
McGowan

(10) Patent No.: US 8,216,435 B2
(45) Date of Patent: Jul. 10, 2012

(54) CALCIUM ALUMINATE CLINKER AS A REFRACTORY AGGREGATE WITH AND WITHOUT BARIUM ADDITION AND USE THEREOF

(75) Inventor: Kenneth A. McGowan, Harrison City, PA (US)

(73) Assignee: Westmoreland Advanced Materials, Inc., Monessen, PA (US)

( * ) Notice: Subject to any disclaimer, the term of this patent is extended or adjusted under 35 U.S.C. 154(b) by 1105 days.

(21) Appl. No.: 11/145,811

(22) Filed: Jun. 6, 2005

(65) Prior Publication Data

US 2005/0271936 A1    Dec. 8, 2005

Related U.S. Application Data

(60) Provisional application No. 60/577,660, filed on Jun. 7, 2004.

(51) Int. Cl.
*H01M 2/02* (2006.01)
*B05D 7/22* (2006.01)
*C25C 7/00* (2006.01)
*C25C 3/08* (2006.01)
*C25C 3/22* (2006.01)

(52) U.S. Cl. ............... 204/247.4; 427/230; 429/176; 205/379

(58) Field of Classification Search ............ 205/379; 429/176; 427/230
See application file for complete search history.

(56) References Cited

U.S. PATENT DOCUMENTS

| 3,556,974 | A | * | 1/1971 | Day ........................ 204/247.4 |
| 3,944,426 | A | | 3/1976 | Nickelsen et al. |
| 4,162,923 | A | | 7/1979 | Schmitt et al. |
| 4,798,628 | A | | 1/1989 | Mills et al. |
| 5,071,484 | A | | 12/1991 | Bonifay et al. |
| 5,108,510 | A | | 4/1992 | Burge et al. |
| 5,356,472 | A | | 10/1994 | Odler |
| 5,851,282 | A | | 12/1998 | Odler |
| 6,730,159 | B1 | | 5/2004 | Falaschi et al. |
| 2005/0049717 | A1 | | 3/2005 | McGowan |

FOREIGN PATENT DOCUMENTS

| CN | 1546409 | 11/2004 |
| DE | 3020896 | 12/1981 |
| JP | 06115986 | 4/1994 |
| JP | 2004299972 | 10/2004 |

\* cited by examiner

*Primary Examiner* — Harry D Wilkins, III
*Assistant Examiner* — Zulmariam Mendez
(74) *Attorney, Agent, or Firm* — Craig G. Cochenour; Buchanan Ingersoll & Rooney PC

(57) ABSTRACT

A method of providing a safety lining in an industrial processing container, such as an aluminum electrolytic cell, is provided comprising providing a container having an interior and a at least one primary lining in juxtaposition to said interior of said shell, and adding a calcium aluminate clinker and/or castable layer between the primary lining and the shell of the container. Further, a method of trapping one or more gasses, elements or compounds produced from industrial processes is provided using the container having the calcium aluminate layer as herein described. An electrolytic cell is disclosed comprising a shell having an interior, one or more primary linings in juxtaposition to the interior of the shell, and one or more safety linings located between the primary lining and the shell, wherein at least one of the safety linings comprises a calcium aluminate clinker and/or castable.

9 Claims, 3 Drawing Sheets

CALCIUM ALUMINATE CLINKER AS A REFRACTORY AGGREGATE WITH AND WITHOUT BARIUM ADDITION AND USE THEREOF

CROSS-REFERENCE TO RELATED APPLICATION

This utility patent application claims the benefit of U.S. Provisional Patent Application Ser. No. 60/577,660, filed Jun. 7, 2004, entitled "Calcium Aluminate Clinker As A Refractory Aggregate With And Without Barium Addition And Use Thereof" having the same named applicant as inventor, namely Kenneth A. McGowan. The entire contents of U.S. Provisional Patent Application Ser. No. 60/577,660 is incorporated by reference into this utility patent application.

BACKGROUND OF THE INVENTION

1. Field of the Invention

The use of calcium aluminate clinker as a refractory aggregate in shapes and castables is covered under a separate filing. This filing addresses the use of calcium aluminate clinker as a dry fill material or as a castable or a combination of both (product) used to provide insulation and degree of chemical protection via reaction with certain materials present in the pot salt bath associated with primary aluminum production. The present invention provides an improved refractory aggregate based on CaO•$Al_2O_3$ clinker (hereinafter referred to as "CA" clinker and designated by the following equation $C_nA_x$, wherein preferably n is an integer from about 1 to 12 and x is an integer from about 1-24) and $C_nA_x$ hydrate phases and analogs or derivatives thereof including those based on barium substitution for calcium or barium additions resulting in calcium substitution after chemical reaction and/or heat treatment, all of which are referred to herein as CA clinker. Refractory materials based on aggregate compositions having these phases singularly or combined, and exclusive of $C_{12}A_7$ as a major phase, are provided in the present invention.

2. Description of the Background Art

Lafarge Calcium Aluminates Inc. (Maryland, USA) markets a calcium aluminate clinker as an aggregate available under their "r50" trade name. This clinker known by those skilled in the art is about 52% alumina and is dense. The presence of a relatively large amount of $C_{12}A_7$ causes the LaFarge Calcium Aluminates, Inc.'s calcium aluminate clinker to melt and the product is essentially fused with little or no porosity. Thus, this composition has little utility as a refractory aggregate. In one embodiment of the present invention, a composition is provided that comprises a $C_nA_x$ clinker that lacks significant amounts of $C_{12}A_7$ and that has the additional benefit of the presence of porosity and usefulness as a refractory aggregate. In addition, the proposed use of any CA material as a chemical trap for application in primary aluminum production is unique regardless of the 'refractoriness' of the material. Thus for this application CA in the form of C12A7 is also a viable chemical trap.

It is known in the refractory arts that the addition of barium-containing materials impart a penetration resistance to materials in contact with molten aluminum. In another embodiment of the present invention, compositions are provided wherein barium is substituted into the CA clinker matrix of the present invention resulting in $BA_6$, $BC_2A_4$ and the other analogs that increase the performance of the product.

The primary area of application for the dry fill product of the present invention is as a backup/safety lining in aluminum pots. In this application the material provides protection from aluminum penetration, insulating character due to inherent thermal conductivity, and penetration by bath salts/fluxes that are used in the aluminum electrolysis process. While not desiring to be bound by any particular theory, the applicant believes that this last benefit is via chemical trapping (trapping of a material by reaction with another material).

SUMMARY OF THE INVENTION

The present invention provides a calcium aluminate (CA) clinker with or without $C_{12}A_7$ as a major phase and further comprising $Al_2O_3$(A), CA (the discrete compound CaO—$Al_2O_3$, not to be confused with the CA clinker) and $CA_2$ as major phases. There can be other phases present in the clinker such as, for example, $C_3A$, $C_2A_4$, etc. Upon heating, the phases can form $CA_6$. In any case, it is known that these phases, including the $C_{12}A_7$, naturally resist penetration of molten aluminum, to a degree. In a preferred embodiment of this invention, the CA clinkers of the present invention, for example, but not limited to rotary kiln products, have other beneficial features, at alumina contents of about 68% and higher. First, the shape of the aggregate is rounded making it easier to create a free flowing material. Also, because of the raw materials used to make the product, it tends to form into porous spheres. The porosity of the spheres becomes important if an insulation material, as a final product, is desired. The benefit here is a more insulating material that resists penetration. If the CA clinker of the instant invention contains little or no $C_{12}A_7$, the material can be used at elevated temperatures consistent with aluminum manufacturing as well as other processes. The $C_{12}A_7$ is a low melting phase that is common to cements having $Al_2O_3$ contents of 65% and lower. The more preferred CA clinker products of this invention are those with an $Al_2O_3$ content greater than sixty eight percent (68%) by weight in the clinker, as opposed to clinker co-ground with other materials such as additional $Al_2O_3$. Preferably, the CA clinker of the present invention as described herein comprises a concentration of $Al_2O_3$ greater than or equal to about sixty eight percent by weight (68% w/w) based upon the current manufacturing process of calcium aluminate cements known by those persons skilled in the art. This leads to a final composition of the present invention having a minimal $C_{12}A_7$ content. However, from the phase diagrams (FIG. 1 and FIG. 2) it can be seen that upon the formation of the CA and $CA_2$ phases (near 68% $Al_2O_3$) and up to but not including pure $Al_2O_3$, represents the ideal composition of the aggregate. That is CA, $CA_2$, $C_3A_5$, $CA_6$ and $Al_2O_3$ alone or in combination. Thus, it will be appreciated by those skilled in the art that the concentration of $Al_2O_3$ can be used as a guideline in determining the potential usefulness of the aggregate. The applicant of the present invention has found that $C_{12}A_7$ concentrations of greater than about 3% (Mol %) would not afford a useful aggregate for applications exceeding 1400 degrees Centigrade if it is primarily used as a refractory aggregate, but may prove useful at lower temperature applications, as is potentially the case if it is primarily used as a chemical trap.

Another embodiment of this invention provides the CA clinker composition as described herein and wherein the composition further includes the addition of barium (added in a variety of forms such as the carbonate or sulfate salts). If the barium exists in the proper ratio with the CaO(C) and the $Al_2O_3$ one can form $BA_6$, $B_3A$, BA, and $BC_2A_4$ (where B=BaO) with temperature. These are analogs of $CA_6$, $C_3A$, and CA, while $BC_2A_4$ is a derivative (FIG. 3 and FIG. 4). The presence of these phases greatly enhances the ability of the product to resist penetration.

Another embodiment of this invention provides a method of providing a safety lining in an industrial processing container comprising providing a container having an interior and at least one primary lining in juxtaposition to the interior of the shell, and adding a calcium aluminate clinker and/or castable (as described herein) layer between the primary lining and the shell of the container. Preferably, the method includes wherein the calcium aluminate clinker and/or castable layer has a thickness of at least about 1.25 centimeters. The container may be an aluminum electrolytic cell.

In another embodiment of this invention, a method of trapping one or more harmful gasses, or elements, or compounds produced from an industrial process is provided comprising providing a container having a shell and an interior and a primary lining in juxtaposition to the interior of the shell, adding a calcium aluminate clinker and/or castable (as described herein) layer behind the primary lining of the container, adding to the interior of the container an electrolytic bath, effecting the failure of the primary lining of the container causing a penetration of the electrolytic bath through the primary lining and the formation of one or more gasses, elements, or compounds, contacting one or more of the gasses, elements, or compounds with the calcium aluminate clinker and/or castable layer, and trapping of one or more of the gasses, elements, or compounds by the calcium aluminate clinker and/or castable layer. This method includes wherein the container is an electrolytic cell. The method includes wherein the industrial process is an electrowinning or electrolysis process. Preferably, the method includes wherein at least one of the gasses is a gas selected from the group consisting of fluorine, chlorine, bromine, iodine, and astatine.

Another embodiment of this invention provides an electrolytic cell comprising a shell having an interior, one or more primary linings in juxtaposition to the interior of the shell, and one or more safety linings located between the primary lining and the shell, wherein at least one of the safety linings comprises a calcium aluminate clinker and/or castable as described herein.

DETAILED DESCRIPTION OF THE INVENTION

Figure 1:
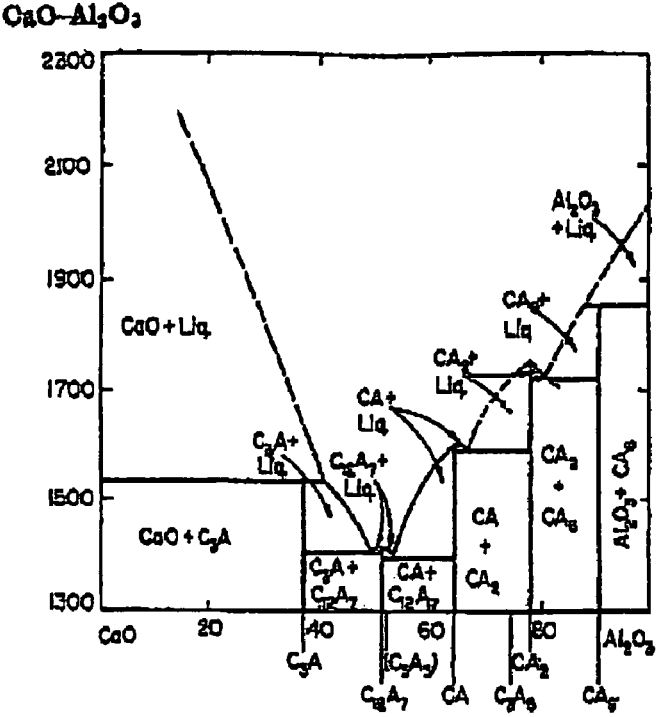
FIG. 1 shows a phase diagram that sets forth the $CaO$-$Al_2O_3$ system. The horizontal axis of FIG. 1 shows molecular formations in the range up to the pure oxide of aluminum or $Al_2O_3$ on the right and pure CaO on the left. The numbers on the horizontal axis represent the percent of $Al_2O_3$ present in the system. The resulting solid phases are shown in the boxes set forth in FIG. 1. The temperatures (in degrees Centigrade) at which they are present, and stable, are shown on the vertical axis of FIG. 1. Note that the boxes of FIG. 1 containing the $C_{12}A_7$ solid begin to form liquids (area above the boxes at or near 1400 degrees Centigrade). The effect of the liquid is reduced strength and increased reactivity with the surrounding environment, both of which are detrimental if the aggregate is to be used as a refractory but potentially beneficial if used as a chemical trap. The diagram of FIG. 1 shows pure CA present at about 68% $Al_2O_3$. From greater than or equal to about 68% $Al_2O_3$ compositions, formed phases are useful as aggregate.
Figure 2:
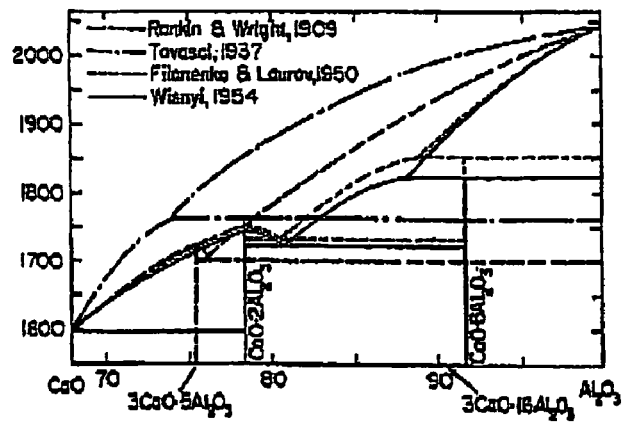
FIG. 2 shows a more detailed description of the higher $Al_2O_3$ portion of FIG. 1.
Figure 3:
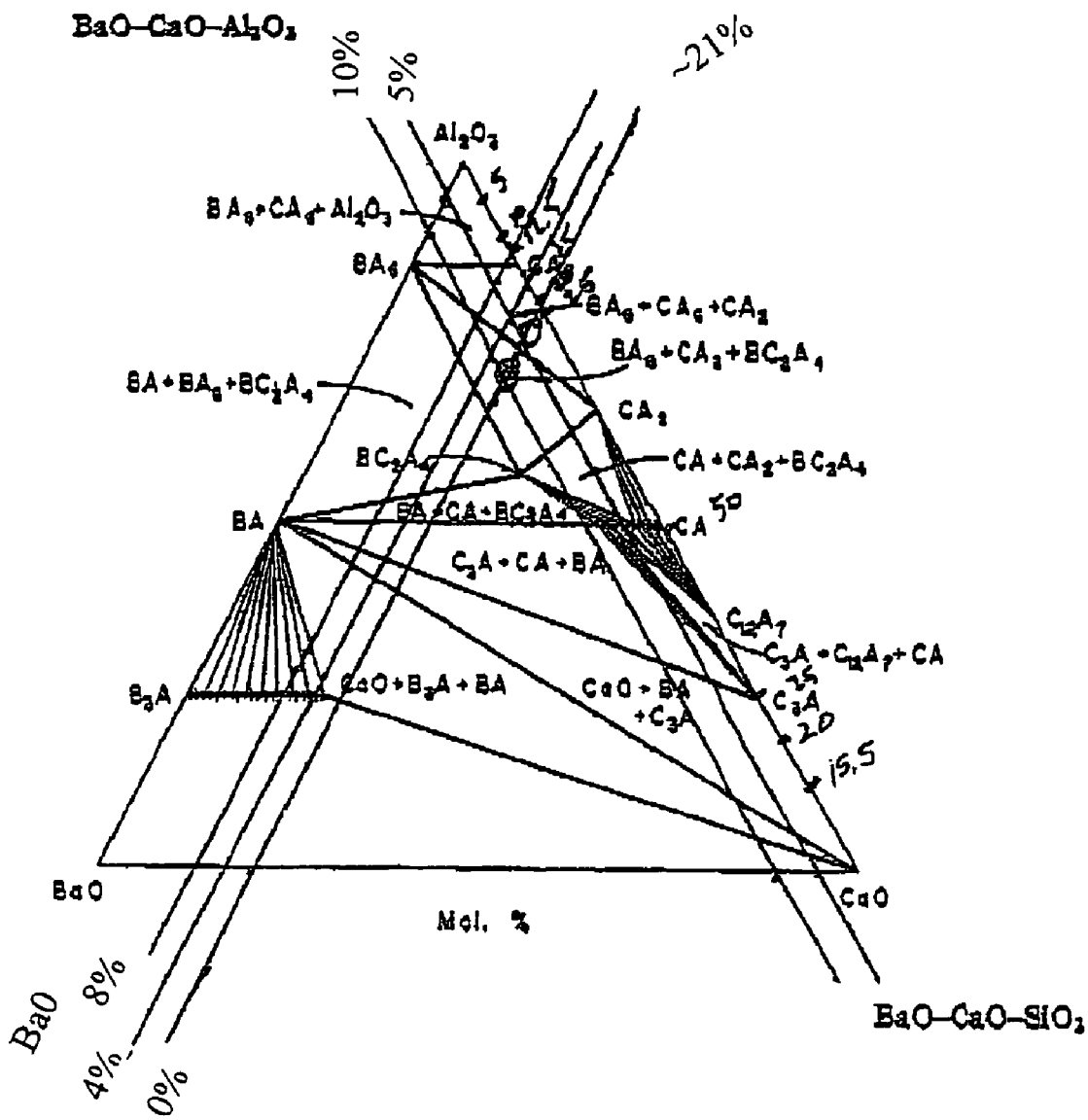
FIGS. 3 and 4 show the system containing BaO at 1250 degrees Centigrade and 1400 degrees Centigrade respectively. BaO concentrations greater than zero percent that lead to formation of $BA_6$ and $C_2BA4$ are beneficial. The presence of $C_2BA4$ (higher concentrations of BaO, via barium sulfate additions in our examples) results in improved penetration resistance of molten aluminum.

1. The Calcium Aluminate (CA) clinker of the present invention as described herein is a viable aggregate (as compared to a bond matrix) for refractory products and as a chemical trap for salts/fluxes commonly used in the metals industry and in primary aluminum manufacturing (i.e. use of the electrolytic cell known by those skilled in the art as pots). The desired chemical result is to trap halogen(s), such as for example but not limited to fluoride, before it reacts to form perfluorocarbon gasses. In the aluminum industry, it is hypothesized that at operating temperatures, for example, 850-950 degrees Centigrade (C), the following reactions will occur:

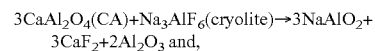

$3CaAl_2O_4(CA)+Na_3AlF_6(cryolite) \rightarrow 3NaAlO_2+ 3CaF_2+2Al_2O_3$ and,

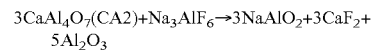

$3CaAl_4O_7(CA2)+Na_3AlF_6 \rightarrow 3NaAlO_2+3CaF_2+ 5Al_2O_3$ $CaF_2$ has a high melting point near 1423° C. making it a good refractory material. Furthermore, it is very resistant to further chemical attack being soluble in NH salts and only very slightly soluble in acid. In both reactions, the alumina compounds ($Al_2O_3$) are already present in the process bath and are refractory and stable if present in this location (insulating/backup/safety lining) of the pot. The composition of the present invention is installed as a loose fill with a packing density as may be required in the bottom and/or the sides of the pot behind the working lining. It may also be installed as a castable or a combination of loose fill and castable. As will be understood by those persons skilled in the art, if the bottom or the sides of the pot (cell) fail and molten bath material leaks through it will contact the CA (CA2) and react as set forth above, thereby sealing off any additional penetration and trapping F as $CaF_2$. By trapping the F, the composition of the present invention is not allowing the F to react to form additional HF or perfluorocarbon gasses. Thus, the CA material of the present invention may be used as a safety barrier in the aluminum electrolytic cell (known by those skilled in the art as pots).

2. The clinker may comprise all of the aggregate or a portion thereof. In the loose fill, this does not include the use of the compound as a discrete bonding matrix such as cement, where it is currently used in a variety of materials.

3. The CA clinker is composed of the usual $C_nA_x$, $C_nA_x$ hydrate, and $Al_2O_3$ phases. It will be appreciated by those persons skilled in the art that commercially available clinker have several impurities present such as for example various iron oxides, silicon oxides, alkali, and alkaline earth compounds, etc. The present applicant has found that the purer the clinker the better will be its temperature resistance, and preferably that the impurities are present in concentrations less that 1%, the clinker will suffice as a useable aggregate. A typical commercially available clinker chemistry is shown here in Table 1 below:

TABLE 1

| Ingredient | Avg. Wt. % |
|---|---|
| $Al_2O_3$ | 69.63 |
| $SiO_2$ | <0.8 |
| $Fe_2O_3$ | <0.5 |
| CaO | 28.12 |
| Others Combined | <0.95 |

It will be appreciated by those skilled in the art that the commercially available clinkers available as set forth in Table 1 will vary from batch to batch and supplier to supplier due to raw material sourcing and other variations.

4. In the compositions of the CA clinker of the present invention, the presence of $C_{12}A_7$ is limited as a minor constituent such that compositions comprise $Al_2O_3$ contents>68% in reference to the aggregate or clinker if the material is to be used primarily as a refractory. If the material is to be used as a chemical trap the presence of C12A7 is not as critical. This does not include co-ground or blended materials whose chemistry can be controlled by addition of discrete dilutents. This is important because $C_{12}A_7$ is a low melting phase that limits the maximum operating temperature of the product if present in substantial amounts. The application of the compositions of the present invention is limited to an operational temperature not exceeding about 1820 degrees Centigrade. At this temperature liquid phases form in the pure system. It should be noted that the product will not be a pure system due to impurities present in the clinker. The CA aggregate or clinker of the present invention may be a sinter product if porosity is desired or a fusion product if porosity is not desired (including partial fusions as a means of controlling porosity). In many cases, porosity is desirable in order to give the furnace lining greater overall insulating character. In molten aluminum contact examples, this can move the freeze plane closer to the hot face and therefore allow for a thinner lining if desired.

Figure 4:
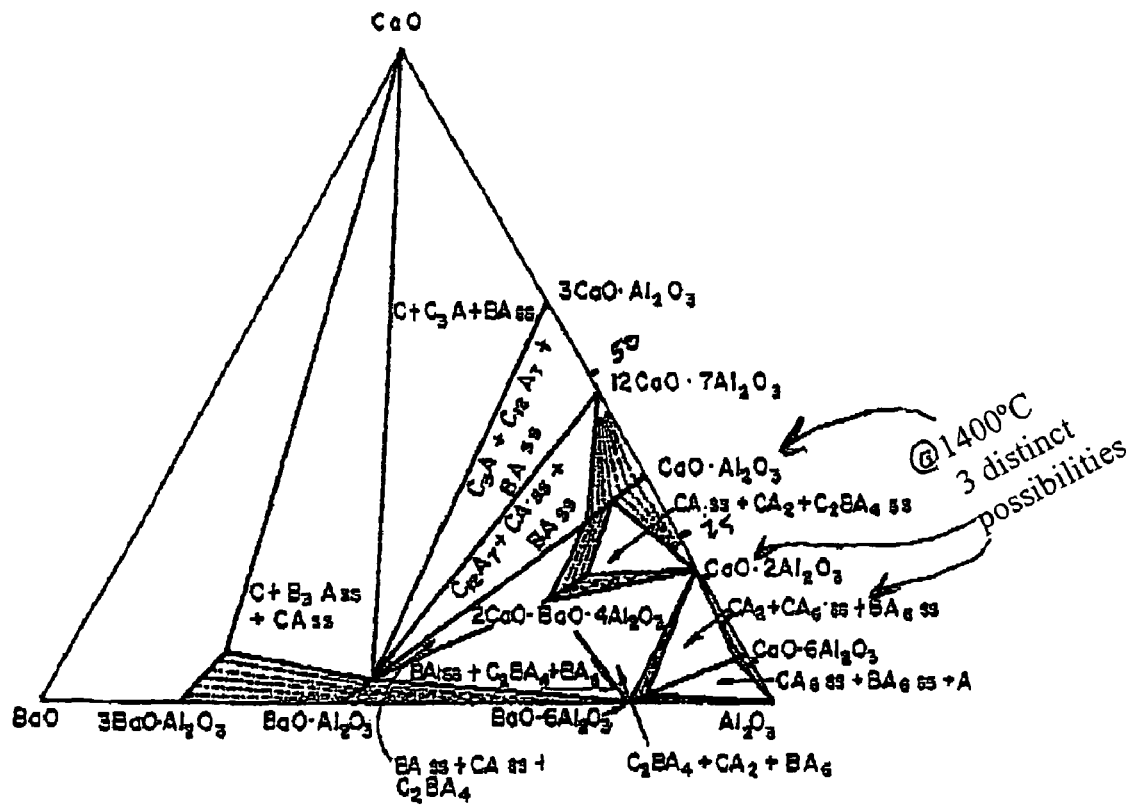

5. The addition of barium to the compositions of the present invention improves the enhanced properties even further by reacting to form analogs and derivatives of the $C_nA_x$ and its hydrates. FIG. 4 shows a phase diagram that sets forth the compounds of interest that are formed and their physical state at 1400 degrees Centigrade. FIG. 4 shows that at $Al_2O_3$ contents of greater than 68% and with the presence of BaO, Ba can exist in three different forms at this temperature: BaO, $BA_6$ as a solid or solid solution and $C_2BA_4$ as a solid or solid solution. The present invention includes a composition and application wherein the presence of all three of these compounds are provided. In a more preferred embodiment of this invention, the compositions include areas of the phase diagram, which can lead to the formation of $BA_6$ and $C_2BA_4$. In a preferred embodiment of this invention, the addition or use of BaO in combination with the CA clinker of this invention is provided.

The following are examples of the compositions of the present invention. As used in the examples, CA clinker is as described herein; CAR60 Alumina is calcined alumina and is commercially available from Alcan Chemicals, Pittsburgh, Pa.; A-3000 FL Alumina is a reactive alumina which are ultrafine refractory material about 0.4 micron and 3.0 microns average particle diameter size, respectively, and are greater than or equal to about ninety-nine (99) weight percent aluminum oxide material and is commercially available from ALMATIS, Leetsdale, Pa.; Tabular Alumina is a refractory aggregate having greater than or equal to about ninety-nine (99) weight percent aluminum oxide commercially available from ALMATIS, Pittsburgh, Pa.; Bubble Alumina may be made by blowing a stream of high pressure air into molten alumina and is commercially available from ALMATIS, Pittsburgh, Pa.; and Calcium Aluminate Cement is a 70 percent alumina and 30 percent calcia cement commercially available under the trade name "Secar 71" from LaFarge Calcium Aluminates Inc.

DETAILED COMPOSITIONAL STRATEGY, EXAMPLE "A"

The following EXAMPLE "A" demonstrates a detailed compositional matrix and the resulting physical properties of the resulting solid body.

Calcium Aluminate clinker of the following chemistry (reported on an oxide basis) was obtained for the study. The material was screened, sized and chemistry was determined on each fraction (see table I)

| | Fraction | | | |
|---|---|---|---|---|
| Oxide | +10 m | 10/28 m | 28/65 m | −65 m |
| | (concentration in Wt %) | | | |
| SiO2 | 0.44 | 0.29 | 0.22 | 0.25 |
| Al2O3 | 71.59 | 71.21 | 70.35 | 71.19 |
| Fe2O3 | 0.07 | 0.01 | <0.01 | 0.01 |
| CaO | 27.38 | 28.08 | 29.02 | 27.95 |
| MgO | 0.27 | 0.22 | 0.21 | 0.31 |
| Na2O | 0.23 | 0.17 | 0.18 | 0.26 |
| K2O | 0.01 | 0.01 | 0.01 | 0.02 |
| P2O5 | 0.01 | 0.01 | 0.01 | 0.01 |

Mineralogical Examination of these Fractions Showed the Following:

| Compound | +10 m | 10/28 m | 28/65 m | −65 |
|---|---|---|---|---|
| | Present | | | |
| CaAl2O4 (CA) | M | M | M | M |
| CaAl4O7 (CA2) | M | M | M | M |
| Ca12Al14O33 (C12A7) | m | m | t | nd |
| Ca3Al2O6 (C3A) | nd | nd | nd | nd |
| Ca5Al6O14 (C5A3) | nd | nd | nd | nd |
| Ca2Al12O5 (C2A) | nd | nd | nd | nd |
| CaAl12O19 (CA6) | nd | nd | nd | nd |
| Ca3Al10O18 (C3A5) | nd | nd | nd | nd |
| CaO (C) | t | t | t | t |
| Al2O3 (A) | t | t | t | t |

M = Major,
m = minor,
t = trace,
nd = not detected

This chemistry and mineralogy is typical for a 70% alumina containing CA cement. CA cements containing greater than 70% alumina can be used. CA cement containing less than 70% alumina can also be used; however, most commercially available products have impurities, which increase in concentration as the alumina content decreases. Common brands of 70% alumina containing CA cement are ALMATIS's CA14 product and Lafarge's Secar 71 product.

The average open porosity of the CA aggregate is 53.5% while the TSG averages 2.9 $g/cm^3$.

| Aggregate | Wt % |
|---|---|
| COMPOSITION EXAMPLE "A" | |
| CA +10 m | 15% |
| CA 10/28 m | 30% |
| CA 28/65 m | 10% |
| CA −65 m | 11% |
| CA −325 m | 7% |
| A-2 alumina | 8% |
| A-3000 alumina | 10% |
| A-1000 alumina | 9% |
| COMPOSITION EXAMPLE "B" | |
| CA +10 m | 15% |
| CA 10/28 m | 30% |
| CA 28/65 m | 10% |
| CA −65 m | 11% |
| CA −325 m | 34% |

These examples show two compositions of the instant invention having varying CA clinker concentrations. The compositions of the present invention is applied as a dry material behind the primary working lining or 'hot face' material. The compositions, such as for example but limited to, may be added behind the primary lining and tamped into place to achieve a thickness preferably greater than one-half inch (about 1.25 centimeters) thickness and more preferably to about a three inch (about 7.6 centimeters) thickness. The present invention may also be mixed with water and applied as a castable or it may be applied partially as dry material (loose fill) and partially as a castable. If material (aluminum or salt) penetrates beyond the working lining the CA would resist further penetration by aluminum and/or react with the bath salt, as above, to limit formation of fluoride containing gasses and prevent further penetration by salt. While the applicant has provided an example of the application of the composition of the present invention in the aluminum industry, the compositions of the present invention may be applied as a trap for a gas production, such as for example but not limited to a halogen gas or halide, or the production of an element or a compound in other industries as well, such as for example but not limited to, the electrowinning process employed in the metal industry, such as for example but not limited to the copper or lead industry.

These examples are not intended to limit the scope of the present invention as described herein. These examples are for purposes of illustration and it will be evident to those persons skilled in the art that numerous variations and details of the instant invention may be made without departing from the instant invention as set forth herein and as defined in the appended claims.

We claim:

1. A method of providing a safety lining in an industrial processing container comprising:
   providing a container having a shell and an interior and at least one primary lining located in said interior of said container and in juxtaposition to said shell; and
   adding one or more safety linings between the primary lining and the shell of said container, wherein at least one of said safety linings comprises a calcium aluminate clinker in the form of a castable or as a loose fill or a combination of a castable and a loose fill, and wherein said calcium aluminate clinker contains greater than 97 average weight percent calcium aluminate, less than 1.01 weight percent MgO impurity and less than 2.25 average weight percent of all mineralogical impurities.

2. The method of claim 1 including wherein said calcium aluminate clinker and/or castable safety lining has a thickness of at least about 1.25 centimeters.

3. The method of claim 1 including providing an aluminum electrolytic cell as said container.

4. A method of trapping a gas, element or compound produced from an industrial process comprising:
   providing a container having a shell and an interior and a primary lining located in said interior of said container and in juxtaposition to said shell;
   adding one or more safety linings behind said primary lining of said container, wherein at least one of said safety linings comprises a calcium aluminate clinker in the form of a castable or as a loose fill or a combination of a castable and a loose fill, and wherein said calcium aluminate clinker contains greater than 97 average weight percent calcium aluminate, less than 1.01 weight percent MgO impurity and less than 2.25 average weight percent of all mineralogical impurities;
   adding to said interior of said container an electrolytic bath;
   effecting the failure of said primary lining of said container causing a penetration of the electrolytic bath through said primary lining and the formation of one or more gasses, elements or compounds;
   contacting of one or more of said gasses, elements or compounds with said calcium aluminate clinker and/or castable safety lining; and
   trapping of one or more of said gasses, elements or compounds by said calcium aluminate clinker and/or castable safety lining.

5. The method of claim 4 including providing an electrolytic cell as said container.

6. The method of claim 4 including providing an electrowinning process as said industrial process.

7. The method of claim 4 including wherein at least one of said gasses comprise at least one halogen.

8. The method of claim 7 including wherein said halogen is selected from the group consisting of fluorine, chlorine, bromine, iodine, and astatine.

9. An electrolytic cell comprising:
   a shell having an interior;
   one or more primary linings in juxtaposition to said interior of said shell; and
   one or more safety linings located between said primary lining and said shell, wherein at least one of said safety linings comprises a calcium aluminate clinker in the form as a castable or as a loose fill or a combination of a castable and a loose fill, wherein said calcium aluminate clinker contains greater than 97 average weight percent calcium aluminate, less than 1.01 weight percent MgO impurity and less than 2.25 average weight percent of all mineralogical impurities.

* * * * *